May 6, 1924.

L. S. LACHMAN ET AL 1,493,042

PREPARING OF METAL PLATES FOR WELDING

Filed Feb. 18, 1922

INVENTORS
Laurence S. Lachman, Maurice Lachman
and Edward Fulda
BY Townsend & Decker
ATTORNEYS

UNITED STATES PATENT OFFICE.

LAURENCE S. LACHMAN, MAURICE LACHMAN, AND EDWARD FULDA, OF NEW YORK, N. Y., ASSIGNORS TO UNIVERSAL ELECTRIC WELDING COMPANY, OF LONG ISLAND CITY, NEW YORK, A CORPORATION OF NEW YORK.

PREPARING OF METAL PLATES FOR WELDING.

Application filed February 18, 1922. Serial No. 537,423.

*To all whom it may concern:*

Be it known that we, LAURENCE S. LACHMAN, MAURICE LACHMAN, and EDWARD FULDA, citizens of the United States and residents of New York, in the county of New York and State of New York, have invented certain new and useful Improvements in Preparing of Metal Plates for Welding, of which the following is a specification.

Our invention relates to the manner of preparing the material for spot welded metal work wherein plates or pieces of metal are fastened face to face by a spot weld or welds on their opposed surfaces.

The object of the invention is to cheapen and facilitate the construction of this class of work and particularly iron or steel construction wherein plates or shapes are fastened to one another or to a tieing or intermediate member as for instance in the construction of columns, girders or frames, in the strengthening of angles by gussets or in other metal constructions.

It has heretofore been proposed to prepare metal plates or pieces for spot welding by deforming the plate itself to produce a welding projection as for instance by means of a tool which indents one surface and pushes out the opposite surface into a protuberance which receives the heating current and pressure when the work is placed between the welding dies. When the projection is formed in this manner the depression opposite the projection permits the metal of the projection to recede under the heat and pressure so that the fullest welding pressure desirable particularly in heavy work cannot be applied before the two surfaces come together. It also has been proposed to employ welding pieces or buttons applied between the pieces or at their back to localize the heating current and pressure but this method is objectionable because it requires special attention to properly placing said welding piece in the desired position of the welded spot and also because the button, when placed between the welded members, tends to keep them apart by the upset or displaced metal of the button or piece remaining after the weld is made.

According to our present invention the surface of the metal is swaged up into one or more welding projections of any desired number and location rising slightly at their highest portion above the plane surface of the metal and so as to form a surrounding depression into which the metal may be forced back in the welding operation so as not to interfere with the bringing of the surfaces into full contact. Moreover the solid projection or protuberance thus formed takes up the full welding pressure and produces a good uniform spot weld while, further, the inconvenience in locating the separate welding pieces or buttons is avoided.

Our invention is particularly useful when it is desired to spot weld a plate on its opposite faces respectively to the faces of and between two other plates or pieces. In this case two projections may be simultaneously swaged in the two faces respectively of the intermediate plate and in line with one another, thus insuring the production of aligned spot welds by simply assembling the three members between the welding dies and applying heating current and pressure in the usual manner.

Inasmuch as the invention is particularly useful in the production of girders, columns or other metal constructions or articles comprising three members superposed and having the two outer members spot welded by their faces against the two faces of the intermediate member, the invention will, for the sake of illustration, be described as so applied.

It is to be understood, however, that the invention may be employed to benefit in the case of composite metal work having two members fastened together face to face by a spot weld, in which instance it is necessary to swage up a projection on one face of one of them only or to use but one of the double projections in the weld itself.

Figure 1:
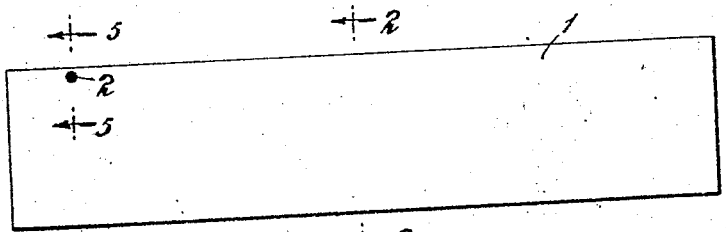
Fig. 1 is a side elevation.
Figure 2:
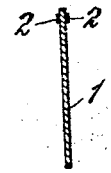
Fig. 2 is a cross-section of a plate for use as the web or flat of a column or girder or other metal construction.
Figure 3:
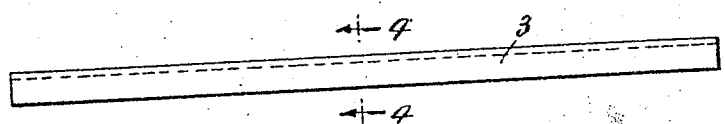
Figs. 3 and 4 are corresponding views of an angle bar or plate adapted for use therewith.
Figure 4:
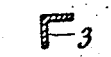
Figure 5:
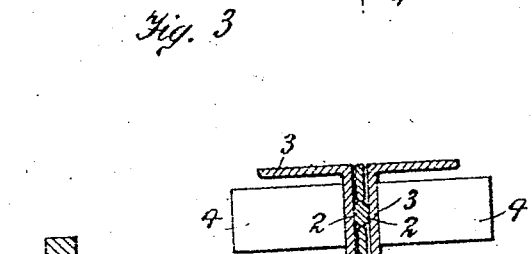
Fig. 5 is a cross-section through the plate or bar in line with the welding projections swaged on its opposite surfaces.
Figure 6:
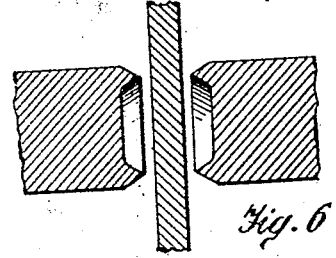
Fig. 6 shows the form of swaging tool suitable for use in forming said projections.

At any number of points and any desired location suitable for firm attachment of the angle plate or bar 3 the plate 1 is prepared for the spot welding operation with projections 2 which, according to my present invention, are simply made by swaging or forging up the surface of the metal of said plate by means of swaging tools or dies such as illustrated in Fig. 6 which, after the well known method of swaging, cause the metal to flow and to assume a shape corresponding to the form of the swaging die, thus producing at an imperforate portion of the metal plate the projections displaced at their highest portions slightly above the general plane of the plate and depressions or grooves at the portions from which metal has been displaced by the pressure, which depressions surround the projections as indicated. These projections form the welding projections for the spot welding operation and receive the heating current and pressure from the welding dies as will be well understood by those skilled in the art of spot welding metal plates. By using two swaging dies as shown, applied at the same time and in line with one another, two projections on the opposite faces are readily produced at once and an alignment of them insured.

While we have shown a pair of tools or dies aligned with one another as a means for swaging the metal into the said projections and surrounding grooves or depressions, it is obvious that they might be formed in other ways and even might be formed in the mill in the process of producing the metal plate 1.

The formation of the projections 2, 2 completes the preparation of the material for the spot welding operation, it not being necessary to prepare the members 3 in any way, they being left imperforate with a uniform plane or flat surface where they are intended to engage the projections of the plate or member 1.

Figure 7:
Fig. 7 shows the members of the construction assembled between welding dies.
Figure 8:
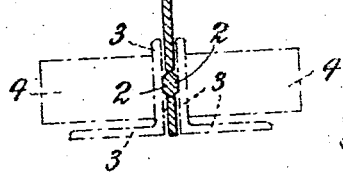
Fig. 8 represents roughly the finished work in section.

Fig. 7 shows the work thus prepared as assembled between the welding dies 4 which are of any usual or proper construction for applying heating current and pressure to weld the parts together in line with the projections. On the application of heavy heating current and pressure by means of the welding dies the three members become welded together in a homogeneous welded joint between their meeting surfaces through the heating and softening of the welding projections to welding temperature.

In this operation the projections receive and localize the current and oppose effective resistance to the pressure applied by the dies, thus insuring the production of a good spot weld. As the pressure and movement of the welding dies is continued the metal of the projections heated and displaced by the pressure and which has been thrown up into the projection by the swaging operation is displaced and received in the annular cavity formed around it by the swaging action so that the three members may be brought into firm contact with one another instead of being kept apart by any of the displaced metal of the spot weld. In the actual operation the displaced metal may likewise become welded to the face of the member or members 3, the extent of the welded union being therefore not limited to the extent of the initial contact surface of the projection.

The invention not only permits flat plates or other metal pieces to be readily spot welded owing to the ease with which the metal may be prepared for the operation followed by merely assembling the parts between the welding dies, but it also is of particular value in the production of flanged metal girders, columns and other metal constructions since the union or unions are of great strength in themselves and far superior to riveted constructions in life owing to the absence of play or clearance between the rivet and the walls of the perforation receiving it.

Furthermore there is no weakening of the structure owing to the necessity of perforating the members which is present in riveted constructions.

Although the invention is particularly useful in the production of structural shapes or structures comprising three members two of which are secured respectively to opposite faces of an intermediate member, it is capable of use also where two members are employed and secured together face to face by a spot weld.

While it is generally desirable to form the projection or protuberance upon one only of the plates or pieces it is obvious that both said pieces might be so prepared and the projections placed in contact with one another for the welding operation. Preferably, however, the projection is formed on one of the pieces only, thus avoiding the necessity of aligning the projections. This advantage is also especially realized when one plate or piece is to be spot welded by both faces to the faces of two plates or pieces enclosing it.

What we claim as our invention is:—

1. The herein described method of preparing the metal for the spot welding of two plates face to face consisting in swaging the surface metal on both faces of one of said members at an imperforate part thereof into a pair of heat and pressure localizing projections in line with one another each surrounded by a depression and extending at its highest point above the said surface.

2. The herein described method of preparing metal for the spot welding of two plates of metal together face to face consisting in providing an imperforate portion of one of said members with a pair of current and pressure localizing projections integral therewith and extending in line with one another from its opposite surface respectively and each surrounded by a groove or depression to receive the displaced metal of the weld when the two members are placed together face to face and subjected to pressure and heating by the electric resistance method.

3. The herein described method of preparing a metal plate for the spot welding of said plate by its two opposite faces respectively to two plates or members enclosing and engaging said intermediate plate by their faces, consisting in swaging upon the opposite faces of the intermediate plate two welding projections in line with one another each of which projects slightly beyond the face of the plate and is surrounded by a groove or depression formed in the swaging operation.

4. The herein described method of preparing a metal plate for the spot welding thereof by its two faces respectively to two other plates on opposite sides thereof, consisting in forming upon the opposite surfaces of the intermediate plate two current and pressure localizing welding projections in line with one another and integral with and projecting slightly above the general plane of the surface thereof.

5. The herein described method of preparing a metal plate for the spot welding thereof by its two faces respectively to two other plates on opposite sides thereof by the application of plane surface welding dies of greater working surface area than the weld, consisting in forming upon the opposite surfaces of the intermediate plate two pressure and current localizing welding projections in line with one another and integral with and projecting slightly above the general plane of the surface thereof, each of said projections being surrounded by a groove or depression below the plane of the surface.

6. The herein described method of manufacturing composite metal work having two bars or plates welded by their faces to the opposite surfaces of an intermediate bar or plate consisting in providing said intermediate bar with a pair of current and pressure localizing welding projections on opposite surfaces thereof respectively and integral with and in alignment with one another, assembling the three bars or plates between a pair of welding dies each having a working surface area adapted to engage an extended surface area on the back of the exterior plates larger than the area of the intermediate plate occupied by the projection and welding the three plates together at said projections by the application of welding current and pressure applied through said dies.

7. The herein described method of manufacturing flanged columns, girders or other metal structure consisting in providing a flat with a pair of current and pressure localizing projections on its opposite surfaces respectively and integral with and in alignment with one another, assembling the same with a pair of angle bars embracing it between a pair of electric welding dies each having a working face adapted to engage the plane surface on the back of the angle bar by an area greater than that of the welding projections on the flat and with an arm of an angle bar interposed between each surface of the flat and one of the pair of welding dies and welding the angle bars to the flat by the application of current and pressure applied through said flat-faced welding dies.

8. The herein described method of preparing metal work for electrically welding two metal members to the opposite surfaces of an intermediate member, consisting in providing the intermediate member with a pair of pressure and current localizing welding projections on its opposite faces respectively in alignment with one another and each surrounded by a cavity or depression, and then assembling the said members between a pair of current supplying pressure dies each having an extended working face adapted to engage the back of the exterior metal member over a surface area greater than that occupied by the welding projections on the opposite faces of the intermediate member and welding the three members together and causing the displaced metal of the metal to be received in said depression by the application of current and pressure by said dies.

9. The herein described method of manufacturing composite metal work in which two pieces of metal are spot welded by their inner faces to opposite faces respectively of an intermediate piece, consisting in swaging or forging upon the intermediate piece two welding projections integral therewith in alignment with one another upon its opposite surfaces respectively and welding them together at said projections by the application of current and pressure applied over comparatively extended surface areas on the back of the two exterior pieces.

10. The herein described method of manufacturing composite metal work in which two pieces of metal are secured to opposite faces respectively of an intermediate piece, consisting in simultaneously swaging or forging upon the intermediate piece two current and pressure localizing welding projections in alignment with one another upon its opposite surfaces respectively and each having a surrounding cavity, and then welding them together at said projections by the application of current and pressure applied over comparatively extended areas on the back of the two exterior pieces.

11. The herein described method of preparing a metal plate for the spot welding of its surface to the plane surface of another plate by the application of two opposite current and pressure dies each having plane working faces of greater area than the welded spot, consisting in simultaneously forming upon the opposite surfaces thereof two current and pressure localizing welding projections in line with one another and integral with and projecting slightly above the general plane surface of said plate.

12. The herein described method of preparing a metal plate for the spot welding of its surface to the plane surface of another plate by the application of two opposite current and pressure dies each having a plane working face of greater area than the welded spot, consisting in simultaneously swaging upon the opposite surfaces thereof two current and pressure localizing welding projections in line with one another and integral with and projecting slightly above the general plane surface of said plate.

13. The herein described improvement in manufacturing composite metal work in which two plates and an intermediate plate are welded together by spot-welding their opposing surfaces, consisting in providing the intermediate plate for the welding operation by subjecting it at any desired place or number of places to a swaging action between a pair of cup-shaped and aligned swaging dies to provide on said plate projections in alignment with one another on its opposite surfaces respectively.

14. The method of manufacturing composite or fabricated metal work wherein two plates are secured respectively to opposite sides of an intermediate plate, consisting in forming on said intermediate plate pairs of welding projections of any desired number and location on and integral with opposite sides thereof respectively, the members of each pair being in alignment with one another, assembling the three plates in the desired fabricated relation between a pair of welding dies and then welding the three plates together by the electric resistance method.

15. The method of manufacturing composite or fabricated metal work wherein two plates are secured respectively to opposite sides of an intermediate plate, consisting in providing upon said intermediate plate one or more pairs of welding projections, the two members of each pair rising respectively from the opposite surfaces thereof in alignment with one another, assembling the three plates in the desired fabricated relation between a pair of welding dies and then welding the three plates together by the electric resistance method.

16. The herein described improvement in method of manufacturing of composite metal work in which members are secured together by a weld formed on the surface of a plate constituting one of said members, consisting in providing said plate with a pair of swaged projections swaged on the opposite surfaces thereof in alignment with one another, and subjecting the members, when assembled, to pressure and current applied by a pair of welding dies having a plane working face of a die embracing a greater area on the engaged surface of a member than the welded spot.

Signed at New York in the county of New York and State of New York this 15th day of February A. D. 1922.

MAURICE LACHMAN.
LAURENCE S. LACHMAN.
EDWARD FULDA.

Witnesses:
F. B. TOWNSEND,
GEORGE E. BROWN.